US012589770B2

(12) United States Patent
Bharmal

(10) Patent No.: US 12,589,770 B2
(45) Date of Patent: Mar. 31, 2026

(54) SAFETY CONTROLLER FOR AUTOMATED DRIVING

(71) Applicant: Robert Bosch GmbH, Stuttgart (DE)

(72) Inventor: Mufaddal Zahid Bharmal, Farmington Hills, MI (US)

(73) Assignee: Robert Bosch GmbH, Stuttgart (DE)

( * ) Notice: Subject to any disclaimer, the term of this patent is extended or adjusted under 35 U.S.C. 154(b) by 719 days.

(21) Appl. No.: 17/460,793

(22) Filed: Aug. 30, 2021

(65) Prior Publication Data

US 2023/0060755 A1 Mar. 2, 2023

(51) Int. Cl.
| | |
|---|---|
| B60W 60/00 | (2020.01) |
| B60W 10/04 | (2006.01) |
| B60W 10/18 | (2012.01) |
| B60W 10/20 | (2006.01) |
| B60W 50/14 | (2020.01) |

(52) U.S. Cl.
CPC ........ B60W 60/0015 (2020.02); B60W 10/04 (2013.01); B60W 10/18 (2013.01); B60W 10/20 (2013.01); B60W 50/14 (2013.01); B60W 60/0011 (2020.02); B60W 60/0053 (2020.02); B60W 2552/05 (2020.02)

(58) Field of Classification Search
CPC .. B60W 60/0015; B60W 10/04; B60W 10/18; B60W 10/20; B60W 50/14; B60W 60/0011; B60W 60/0053; B60W 2552/05
See application file for complete search history.

(56) References Cited

U.S. PATENT DOCUMENTS

| | | | |
|---|---|---|---|
| 5,136,498 A | 8/1992 | McLaughlin et al. | |
| 9,081,653 B2 | 7/2015 | Ricci et al. | |
| 9,195,232 B1 | 11/2015 | Egnor et al. | |
| 9,542,846 B2 | 1/2017 | Zeng et al. | |
| 9,740,178 B2 | 8/2017 | Debouk et al. | |
| 10,397,019 B2 | 8/2019 | Hartung et al. | |
| 11,214,271 B1 * | 1/2022 | Gunaratne ...... | B60W 60/00186 |
| 11,214,273 B2 * | 1/2022 | Yousuf ................ | G06F 11/1487 |
| 2014/0310739 A1 * | 10/2014 | Ricci .................... | G06Q 20/321 |
| | | | 725/75 |
| 2017/0270798 A1 * | 9/2017 | Ushiba .................. | G08G 1/161 |
| 2018/0143633 A1 * | 5/2018 | Paryani ............. | H04L 12/40013 |

(Continued)

FOREIGN PATENT DOCUMENTS

| | | | | |
|---|---|---|---|---|
| CN | 109032132 A | * | 12/2018 | ........... G05D 1/0214 |

OTHER PUBLICATIONS

Machine translation of CN 109032132 A (Year: 2018).*

*Primary Examiner* — James J Lee
*Assistant Examiner* — Alexander George Matta
(74) *Attorney, Agent, or Firm* — Michael Best & Friedrich LLP

(57) ABSTRACT

Systems and methods for a safety control framework for automated driving systems in which a second controller—with different/diverse hardware and/or software than the first controller—verifies whether a path plan generated by the first controller meets certain safety conditions and preempts the first controller from controlling automated driving of the host vehicle in response to determining that the path plan does not satisfy the safety conditions. In some implementations, the second controller is configured to preempt the first controller by operating the vehicle under automated control using a safety path plan generated by the second controller.

20 Claims, 5 Drawing Sheets

(56) References Cited

U.S. PATENT DOCUMENTS

| | | | |
|---|---|---|---|
| 2018/0208195 A1* | 7/2018 | Hutcheson | B60W 50/14 |
| 2021/0107478 A1* | 4/2021 | Goto | B60W 30/182 |
| 2021/0380132 A1* | 12/2021 | Narang | B60W 30/18163 |
| 2023/0066635 A1* | 3/2023 | Chandrasekaran | B60W 30/146 |

* cited by examiner

SAFETY CONTROLLER FOR AUTOMATED DRIVING

BACKGROUND

The present invention relates to systems and methods for fully automated and/or semi-automated driving.

SUMMARY

Some of the embodiments described herein provide a multiple-controller-based system for highly automated driving (HAD). In some implementations, the system includes a first controller configured to make automated driving path-planning decisions. For example, based on inputs from one or more sensors (e.g., camera, proximity sensor, etc.), the first controller decides how to operate the vehicle during automated driving (e.g., adjusting speed, changing lanes, etc). The second controller is a dedicated "safety" controller. Instead of providing redundant functionality (i.e., the same hardware and software as the first controller), the second controller is configured to determine safety conditions (e.g., which driving paths/decisions are permissible). If the first controller makes a driving decision that falls within a "permissible path" as determined by the second controller, then the first controller is allowed to continue to operate the vehicle autonomously. However, if the first controller makes a driving decision that would violate a safety constrain as determined by the second controller, then the second controller will either (a) revert the system to a manual driving mode or (b) apply a "fail operational" driving control functionality where the second controller takes over automated operation of the vehicle to bring the vehicle to a safe stop.

In some implementations, the second controller is configured to apply a higher ASIL ("automotive safety integrity level") than the first controller and, therefore, is configured to prioritize safety over efficiency. Having two separate controllers, each programmed with diverse software (e.g., different software), also enables the system to address latent faults in the hardware/software of the first controller that could make different decisions causing ambiguity within path planning.

In one embodiment, the invention provides an automated driving system comprising a first controller and a second controller. The first controller is configured to determine, based at least in part on vehicle sensor data indicative of one or more detected objects, a location of a host vehicle relative to the one or more detected objects; determine, based at least in part on the relative location of the host vehicle, a path plan for the host vehicle; transmit to the second controller data indicative of the path plan for the host vehicle; and transmit control signals to at least one vehicle system causing the at least one vehicle system to operate movement of the host vehicle according to the path plan. The second controller is configured to receive the data from the first controller indicative of the path plan for the host vehicle; determine, based at least in part on the vehicle sensor data indicative of the one or more detected objects, whether the path plan is a permissible path in accordance with one or more safety conditions; and preempt the transmission of the control signals from the first controller to the at least one vehicle system in response to determining that the path plan is not a permissible path.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
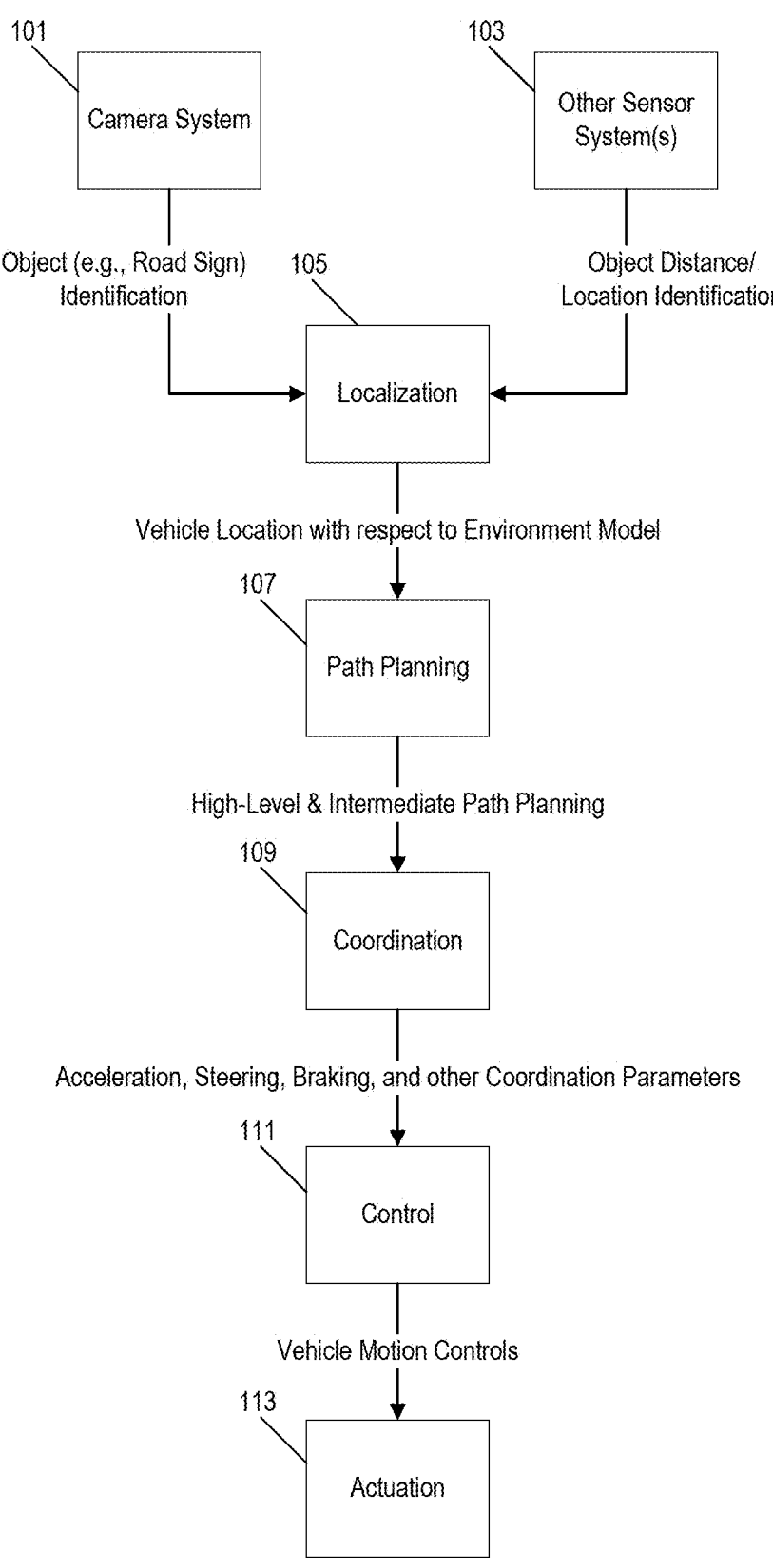
FIG. 1 is a schematic block diagram of a system for automated operation of a vehicle in some implementations.

FIG. 1 illustrates an example of a system framework for providing fully and/or partially automated driving of a vehicle such as, for example, a passenger automobile operating on a roadway. A camera system 101 captures image data of an area around the host vehicle and, in some implementations, is configured to output information including, for example, identification of objects such as road signs. Other sensor systems 103 including one or more individual sensor systems such as, for example, proximity sensing systems, RADAR systems, LIDAR systems, GPS, etc. are configured, in some implementations, to capture data regarding the area surrounding the host vehicle. In some implementations, the other sensor systems 103 may include a sensor fusion system configured to collect the data captured by the one or more sensors, analyze the collected data, and output information regarding the location of objects in the area surround the host vehicle and/or distances between the host vehicle and the one or more objects.

In the example of FIG. 1, the information from the camera system 101 and the other sensor systems 103 are provided as input to a localization layer 105 that is configured to determine a location of the vehicle with respect to a modeled environment. A path planning layer 107 then uses this information to determine an appropriate path for the vehicle to travel within the modeled environment. A coordination layer 109 then determines specific vehicle operating parameters (e.g., acceleration parameters, steering parameters, braking parameters, etc.) that will cause the vehicle to move appropriately according to the defined path plan. A control layer 111 then determines specific actuator signals/commands that will cause the vehicle to implement the determined operating parameters. An actuation layer 113 includes a plurality of vehicle actuators that receive the control signals from the control layer 111 and operate accordingly.

Figure 2:
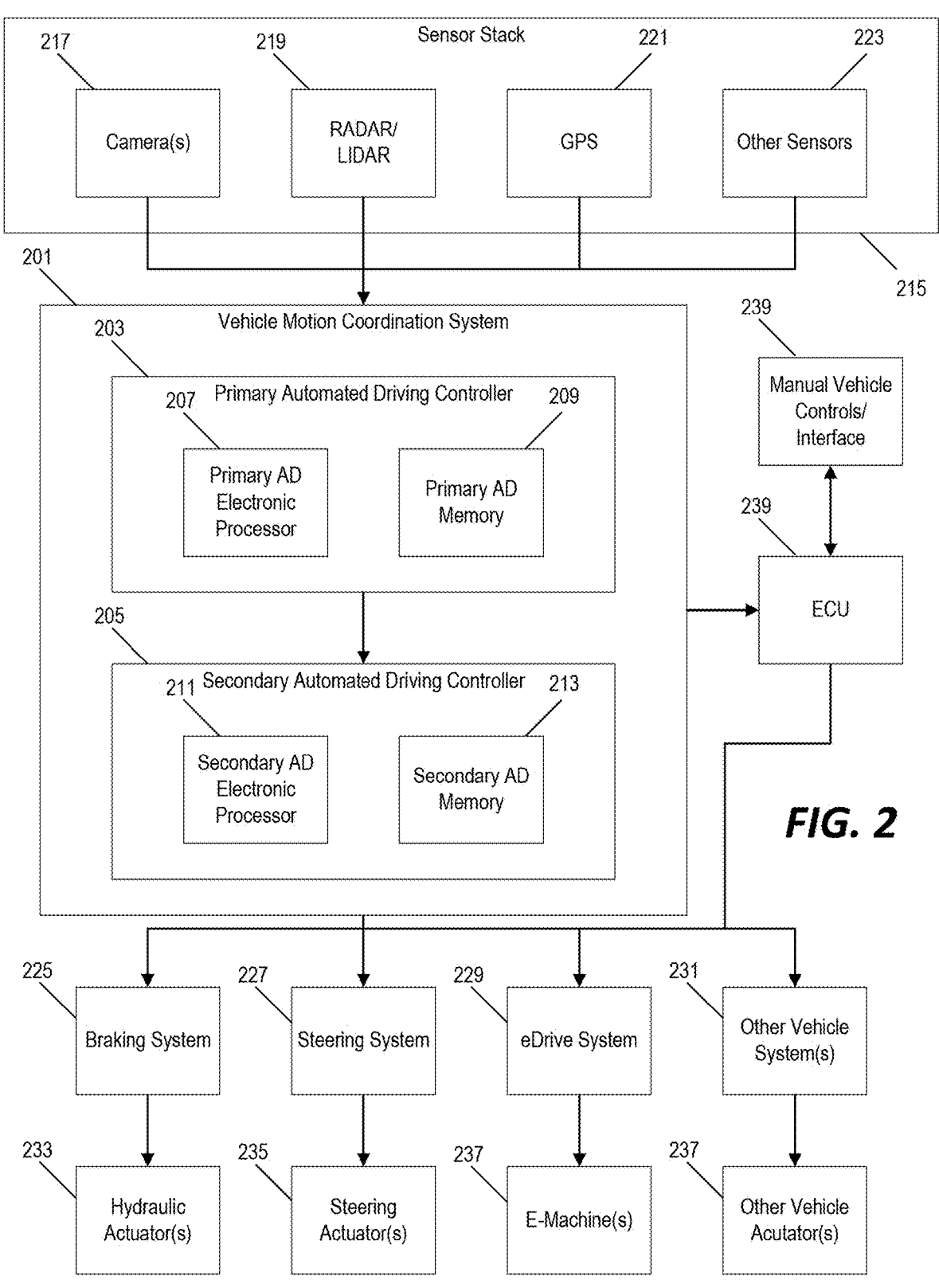
FIG. 2 is a block diagram of the system of FIG. 1 including a dual-controller vehicle motion coordination system.

FIG. 2 is a block-diagram of a system configured to implement the framework of FIG. 1. A vehicle motion coordination system 201 includes two separate controllers—a primary automated driving controller 203 and a secondary automated driving controller 205. The primary automated driving controller 203 includes an electronic processor (i.e., "Primary AD Electronic Processor 207") and a non-transitory computer-readable memory (i.e., "Primary AD Memory 209"). Similarly, the secondary automated driving controller 205 also includes an electronic processor (i.e., "Secondary AD Electronic Processor 211") and a non-transitory computer-readable memory (i.e., "Secondary AD Memory 213"). The memories 209, 213 are each communicatively coupled to the respective electronic processor 207, 211 and each stores data and computer-executable instructions that, when executed by the respective electronic processor 207, 211, provides the functionality of the respective controller 203, 205 including, for example, the functionality as described herein below.

The vehicle motion coordination system 201 is communicative coupled to a sensor stack 215 including one or more camera systems 217, a RADAR and/or LIDAR system 219, a GPS system 221, and one or more other systems 223. In this example, the vehicle motion coordination system 201 is configured to operate as the localization layer 105, the path planning layer 107, and the coordination layer 109. Accordingly, as described in further detail below, the vehicle motion coordination system 201 is configured to receive an environment model from the sensor stack 215 and/or to generate the environment model from data received from the sensor stack 215, to determine a vehicle location with respect to the environment model (i.e., the localization layer 105), to determine a path plan for operating the vehicle within the environment model (i.e., the path planning layer 107), and to determine appropriate operating parameters for the various vehicle systems in order to implement the path plan (i.e., the coordination layer 109).

The vehicle motion coordination system 201 then transmits the determined operating parameters to one or more vehicle systems. In the example of FIG. 2, the vehicle systems that correspond to the control layer 111 of FIG. 1 include a braking system 225, a steering system 227, an eDrive system 229, and one or more other vehicle systems 231. The braking system 225 receives one or more braking parameters from the vehicle motion coordination system 201 and is configured to determine and transmit corresponding control signals to hydraulic actuators 233 that provide appropriate braking force for the host vehicle. The steering system 227 receives one or more steering parameters from the vehicle motion coordination system 201 and is configured to determine and transmit corresponding control signals to one or more steering actuators 235 configured to adjust the steering of the host vehicle. The eDrive system 231 receives one or more drivetrain parameters (e.g., an acceleration parameter) from the vehicle motion coordination system 201 and is configured to determine and transmit corresponding control signals to one or more drivetrain actuators (i.e., E-Machine actuators for an electric motor of an electric or hybrid vehicle). The other vehicle systems 231 are similarly configured to receive one or more operating parameters from the vehicle motion coordination system 201 and are configured to determine and transmit corresponding control signals to one or more other vehicle actuators 237. In the example of FIG. 2, the actuation layer 113 of FIG. 1 includes the hydraulic actuators 233, the steering actuators 235, the E-Machine actuators 237, and other application vehicle actuators 237.

In the example of FIG. 2, the vehicle motion coordination system 201 is also communicatively coupled to a primary electronic control unit ("ECU") 239. In some implementations, the ECU 239 is configured to provide information that is displayed to an operator of the host vehicle and to receive user inputs through the manual vehicle controls and interface 241 of the host vehicle. For example, in some implementations, the manual vehicle controls/interface 241 may include a touch-sensitive display and the ECU 239 may be configured to cause the touch-sensitive display to display a navigation map to the user and to receive inputs through the touch-sensitive display indicative of a user's operating preference (e.g., preferred speed, efficiency vs. safety, etc.).

The manual vehicle controls/interface 231 also includes traditional vehicle controls such as, for example, a steering wheel, an accelerator pedal, and a brake pedal. In some such implementations, the ECU 239 may be configured to operate the vehicle under a "manual" driving mode by receiving user inputs the manual vehicle controls/interface 231 and providing corresponding operating parameters as inputs to the various vehicle systems (e.g., the braking system 225, the steering system 227, the eDrive system 229, and the one or more other vehicle systems 231).

In some implementations, the vehicle motion coordination system 201 is configured to provide symmetric functionality by including two identical controllers where the hardware and the software of the primary automated driving controller 203 is duplicated by the secondary automated driving controller 205 for redundancy. In some such implementations, the use of identical redundant controllers provides a "fail-safe" system in which the drive is required to takeover some or all of the operation of the host vehicle when the outputs as determined by the redundant controllers do not match (which may be indicative of an error condition).

Figure 3:
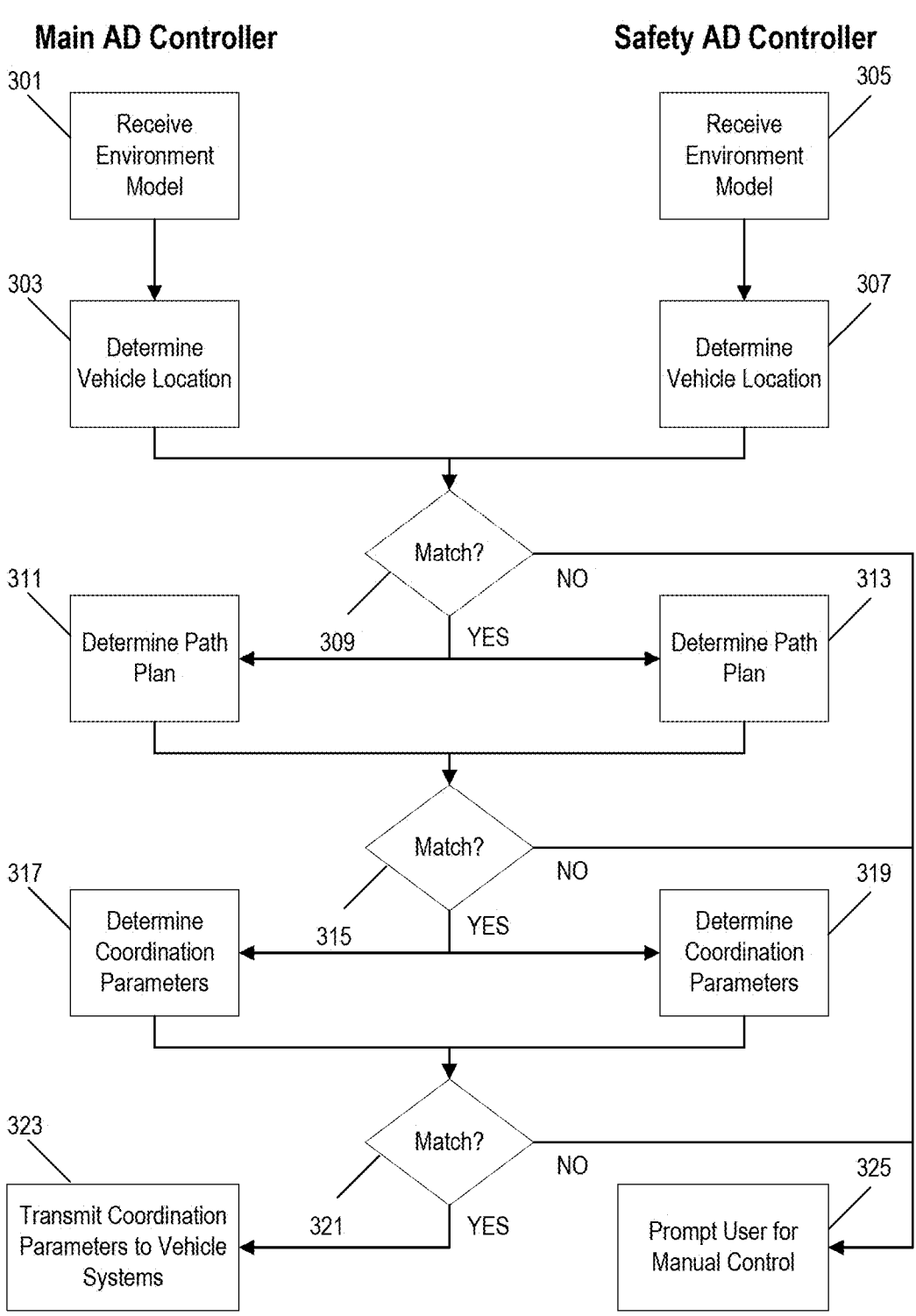
FIG. 3 is a flowchart of a method for providing automated operation of a vehicle using the system of FIG. 2 with a fail-safe system provided by two identical, redundant controllers.

FIG. 3 illustrates an example of a method for providing fail-safe operation of the vehicle using a pair of identical redundant controllers 203, 205. The primary automated driving controller 203 receives an environment model from the sensor systems (step 301) (or, in some implementations, generates an environment model based on data received from the sensors of the sensor stack 215) and then determines a location of the host vehicle in the environmental model (step 303) (e.g., using GPS location data, stored maps, and/or data captured by the sensors of the sensor stack 215). Similarly, the secondary automated driving controller 205 receives an environment model from the sensor systems (step 305) (or, in some implementations, generates an environment model based on data received from the sensors of the sensor stack 215) and then determines a location of the host vehicle in the environmental model (step 307) (e.g., using GPS location data, stored maps, and/or data captured by the sensors of the sensor stack 215).

Each controller 203, 205 then transmits the determined vehicle location information to the other controller and determines whether the determined vehicle locations match (step 309). If so, then the primary automated driving controller 203 proceeds to determine an appropriate path plan (step 311) and the secondary automated driving controller 205 also determines an appropriate path plan (step 313). The controllers 203, 205 then transmit the determined path plans to each other and determine whether the path plans match (step 315). If so, then the primary automated driving controller 203 and the secondary automated driving controller 205 each proceed to determine appropriate coordination parameters based on the determined path plan (step 317 and step 319, respectively). The controllers 203, 205 then transmits the set of coordination parameters to each other and determine whether the coordination parameters match (step 321) and, if so, the primary automated driving controller 203 and/or the secondary automated driving controller 205 transmits the coordination parameters to the appropriate vehicle systems (step 323).

In the example of FIG. 3, each determination made by the two identical controllers 203, 205 is validated by comparing the determination to the determination made by the other controller. Accordingly, the vehicle motion coordination system 201 only reaches the step of transmitting the coordination parameters to the vehicle systems (step 321) if all of the determinations made by the two controllers 203, 205 match. Otherwise, if the determinations fail to match at any point, the primary automated driving controller 203 and/or the secondary automated driving controller 205 transmit a signal to the ECU 239 to provide a prompt to the user of the host vehicle and to transition from automated driving mode into a manual driving mode.

In the example of FIG. 3, the controllers 203, 205 separately check whether the determined vehicle location, the determined path plan, and the determined coordination parameters match before proceeding to the next step. However, in some implementations, the primary automated driving controller 203 and the secondary automated driving controller 205 may be configured instead to check for a match of only a single determination. For example, the vehicle motion coordination system 201 may be configured to only determine whether the coordination parameters determined by the two separate controllers 203, 205 match before transmitting the coordination parameters to the vehicle systems (step 323). Additionally, although the example of FIG. 3 shows each controller 203, 205 separately transmitting information to the other controller and determining whether the information matches, in some implementations, the controllers 203, 205 may be configured to receive and/or determine an indication of which controller is assigned as "primary" and which is assigned as "secondary." In some such implementations, only the secondary controller 205 transmits the determined information (e.g., coordination parameters) to the primary controller 203 and only the primary controller 203 determines whether the information determined by the separate controllers matches. Finally, in some implementations, a match does not necessarily require an identical match of data determined by the separate controllers. Instead, in some implementations, the determined information is determined to "match" if the information determined by the primary controller 203 is within a defined tolerance of the information determined by the secondary controller 205.

A system, such as illustrated in FIG. 2, that includes a secondary automated driving controller 205 that is identical to the primary automated driving controller 203 (in both hardware and software) and that is configured to execute the method illustrated in the example of FIG. 3 is able to detect fault conditions in the vehicle control system including, for example, damage or faults in one of the controllers 203, 205 and/or damage to the connectivity between the sensors stack 215 and the controllers 203, 205. However, latent faults due to the configuration of the controller (e.g., hardware and/or software) cannot be detected by the method of FIG. 3 because both controllers 203, 205 would experience the same latent fault and the determined outputs from the two controllers 203, 205 would still match.

Figure 4:
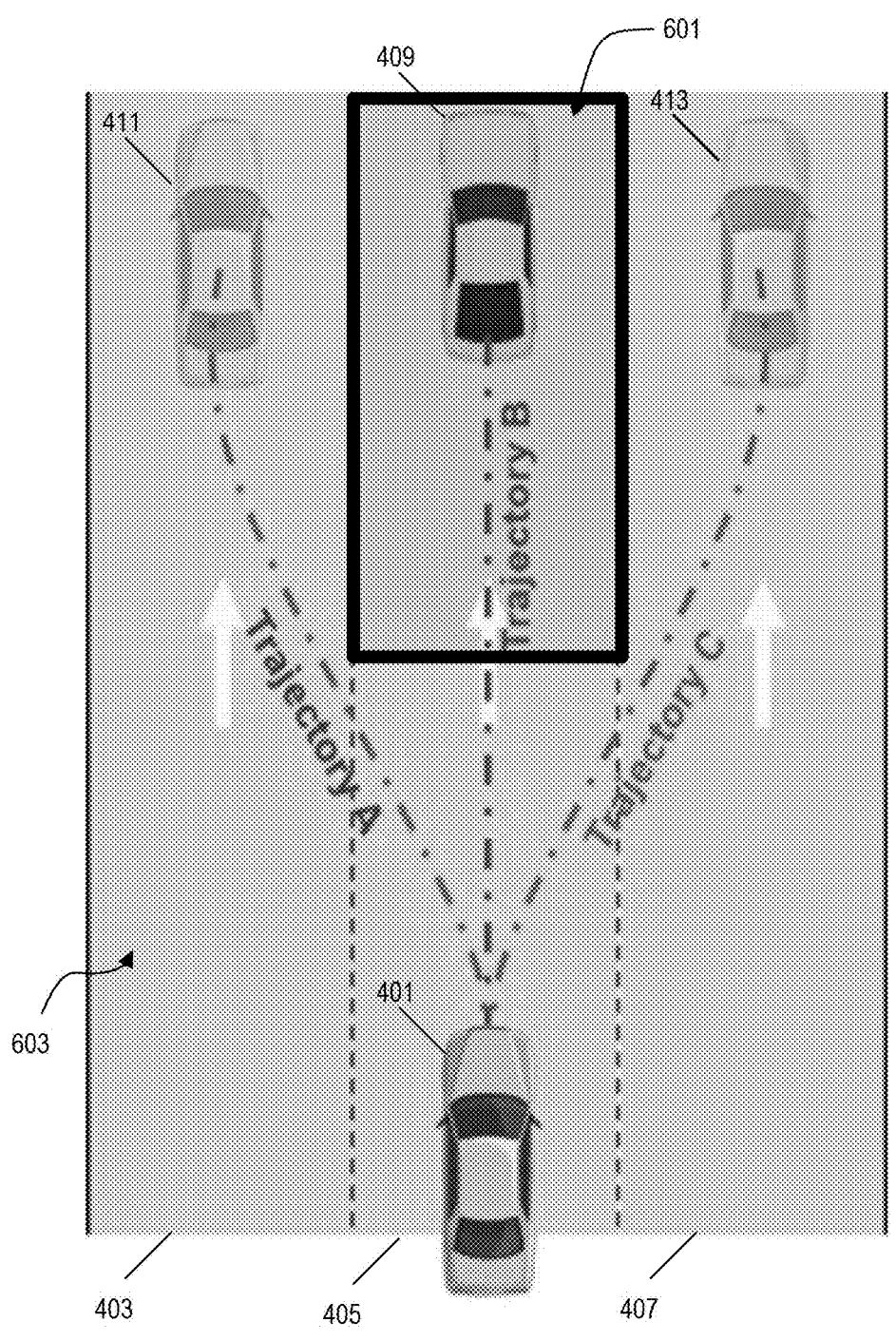
FIG. 4 is an overhead view of a host vehicle and a target vehicle operating on a road surface.

Additionally, when a vehicle driving scenario presents multiple different "correct" path planning options, the symmetric functionality in the method of FIG. 3 could cause the primary automated driving controller 203 to reach a different path planning decision than the secondary automated driving controller 205. For example, FIG. 4 illustrates a driving scenario where a host vehicle 401 is operating a roadway with three separate lanes—a left lane 403, a center lane 405, and a right lane 407. The host vehicle 401 is currently operating in the center lane 405 behind another vehicle 409 that is also operating in the center lane 405. In this scenario, the host vehicle 401 has at least three different path planning options. First, the host vehicle 401 could move from the center lane 405 into the left lane 403 and pass the other vehicle 409 by following "Trajectory A" to the first target position 411. Second, the host vehicle 401 could reduce its own speed and continue to operate in the center lane 405 behind the other vehicle 409 by following "Trajectory B." Third, the host vehicle 401 could move from the center lane 405 into the right lane 407 and pass the other vehicle 409 by following "Trajectory C" to the second target position 413. Any of these three path plans might be "correct" in that they enable the host vehicle 401 to continue to operate on the road surface while avoiding a collision with the other vehicle 409. However, if the primary automated driving controller 203 and the secondary automated driving controller 205 each decide on a different path plan, the discrepancy would result in ambiguity between the outputs of the two controllers which could be interpreted by the controllers 203, 205 as a "fault" and would force the host vehicle 401 into the manual driving mode.

In some other implementations, the secondary automated driving controller 205 is configured to include different/diverse hardware and/or software than the primary automated driving controller 203 and is configured to operate as a preemptive safety controller. In some implementations, instead of determining a path plan based on the sensor data and the environment model, the secondary automated driving controller 205 is configured to identify areas on the driving surface that correspond to a "permissible path" and to determine whether the path plan identified by the primary automated driving controller 203 would keep the host vehicle within the permissible path areas.

Figure 5:
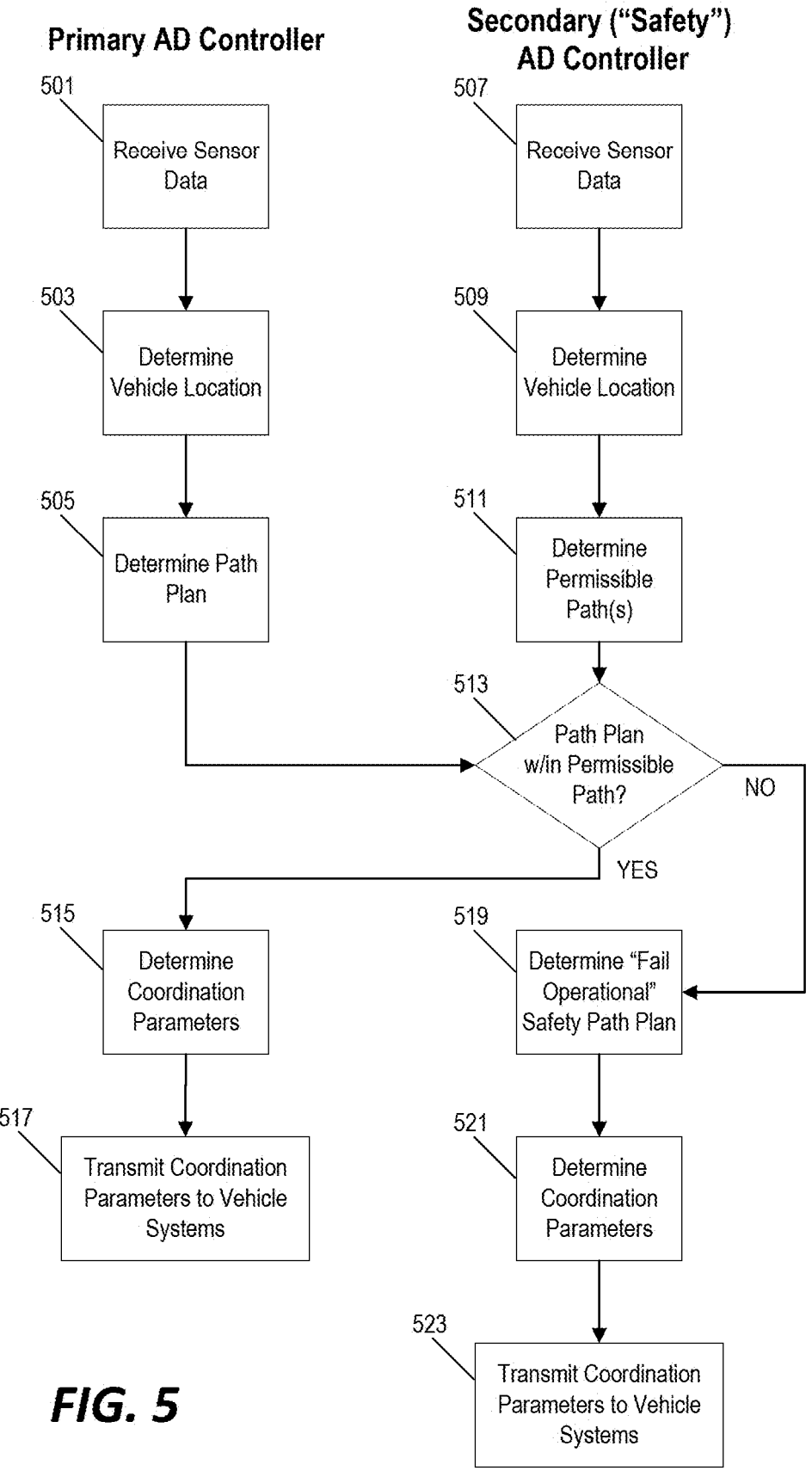
FIG. 5 is a flowchart of a method for providing automated operation of a vehicle using the system of FIG. 2 with a fail-operational system provided by two different controllers.

FIG. 5 illustrates one example of a method performed by a vehicle motion coordination system 201 including a secondary automated driving controller 205 that is configured to operate as a preemptive safety controller for the primary automated driving controller 203. The primary automated driving controller 203 receives the sensor data (or, in some implementations, an environment model) (step 501) and determines a current location of the host vehicle with respect to the roadway and other objects detected in the area of the roadway (step 503). Based on this information, the primary automated driving controller 203 determines a path plan for the host vehicle (step 505). At the same time, the secondary automated driving controller 205, also receives the sensor data (or, in some implementations, an environment model) (step 507) and also determines a current location of the host vehicle with respect to the roadway and other objects detected in the area of the roadway (step 509). However, instead of also determining a path plan, the secondary automated driving controller 205 determines a set of areas on the roadway surface corresponding to a permissible path area (step 511).

The primary automated driving controller 203 transmits its path plan to the secondary automated driving controller 205 and the secondary automated driving controller 205 determines whether the path plan would operate the host vehicle within the permissible path areas (step 513). If the path plan is within the permissible path area(s), then the secondary automated driving controller 205 allows the primary automated driving controller 203 to continue to control the operation of the host vehicle. The primary automated driving controller 203 determines a set of coordination parameters (step 515) based on the determined path plan and transmits the coordination parameters to the vehicle systems (step 517) which, in turn, control the various vehicle actuators to cause the host vehicle to operate according to the path plan.

However, if the secondary automated driving controller 205 determines that the path plan would not keep the host vehicle within the permissible path areas (step 513), the secondary automated driving controller 205 determines its own safety path plan for the host vehicle (step 519), determines appropriate coordination parameters based on the safety path plan (step 521), and transmits the coordination parameters to the vehicle systems (step 523) which, in turn, control the various vehicle actuators to cause the host vehicle to operate according to the safety path plan.

As a result, driving scenarios in which multiple different path plans would be acceptable are less likely to trigger a fault condition. Referring again to the example of FIG. 4, the secondary automated driving controller 205 may be configured to determine that safety conditions would be violated if the host vehicle were to operate in a restricted area 601 that includes anywhere within the center lane 504 less than a threshold distance behind the rear of the other vehicle 409. Accordingly, the secondary automated driving controller 205 would determine that the permissible path area 603 includes the remainder of the roadway surface outside of the restricted area 601 occupied by the other vehicle 409. In this scenario, the primary automated driving controller 203 could select any of the three possible path plans discussed above (i.e., "Trajectory A," "Trajectory B," or "Trajectory C") and the secondary automated driving controller 205 would allow the primary automated driving controller 203 to continue to control the operation of the host vehicle. However, for example, if the primary automated driving controller 203 were to output a path plan that would follow "Trajectory B" and at a speed that would cause the host vehicle 401 to enter the restricted area 601, then the secondary automated driving controller 205 would detect a fault condition and would take over operation of the host vehicle 401 according to the safety path plan determined by the secondary automated driving controller 205.

In the example of FIG. 5, the secondary automated driving controller 205 is configured to receive the determined path plan from the primary automated driving controller 203 and to determine whether the path plan would keep the vehicle within the permissible path area 503. However, in some implementations, the secondary automated driving controller 205 is configured to receive other information determined by the primary automated driving controller 203. For example, in some implementations, the primary automated driving controlled 203 is configured to determine a set of coordination parameters based on the determined path plan and to transmit the set of coordination parameters to the secondary automated driving controller 205. The secondary automated driving controller 205 is configured to then determine whether operating the host vehicle 401 according to the set of coordination parameters would cause the host vehicle 401 to leave the permissible path area 603 and enter a restricted area 601. Accordingly, in such implementations, the secondary automated driving controller 205 is configured to detect a fault condition of the primary automated driving controller 203 by recreating a planned driving path based on the coordination parameters and, in response to detecting a fault condition, prevents the primary automated driving controller 203 from sending the coordination parameters to the vehicle systems. In still other implementations, instead of defining a permissible path area, the secondary automated driving controller 205 may be configured to receive the path plan from the primary automated driving controller 203 and to evaluate the path plan (as compared to the received sensor data and/or environment model) to determine whether the path plan proposed by the primary automated driving controller 203 would violate any defined safety parameters—in other words, the secondary automated driving controller 205 may be configured to directly evaluate whether a path plan proposed by the primary automated driving controller 203 is itself a "permissible plan."

Additionally, in the example of FIG. 5, the secondary automated driving controller 205 is configured to determine a safety path plan in response to detecting a fault in the primary automated driving controller 203. In some implementations, the secondary automated driving controller 205 is configured to determine a safety path plan that places a higher priority on safety relative to efficiency as compared to the path plan determination used by the primary automated driving controller 203. For example, the secondary automated driving controller 205 may be configured to use a higher ASIL (i.e., "Automotive Safety Integrity Level") than the primary automated driving controller 203. In some implementations, the secondary automated driving controller 205 is configured to determine the safety path plan using lower host vehicle operating speeds and wider distances between the host vehicle and other detected objects as compared to host vehicle speeds and minimum object distances used by the primary automated driving controller 203 in determining a path plan.

Furthermore, as discussed above, in systems that implement the method of FIG. 5, the hardware of the secondary automated driving controller 205 may be different than the hardware of the primary automated driving controller 203. Because the secondary automated driving controller 205 is configured to confirm the safety of the path plan proposed by the primary automated driving controller 203 and, if necessary, to determine a safety path plan using higher ASIL requirements, the primary automated driving controller 203 can be implemented using relatively low ASIL requirements. Because less computing power may be required to determine an appropriate path plan under the lower ASIL requirements, less expensive hardware may be used for the primary automated driving controller 203 than for the secondary automated driving controller 205 in some implementations.

Also, in the example of FIG. 5, the safety path plan allows the host vehicle to continue to operate in an automated driving mode. In some implementations, the secondary automated driving controller 205 may be configured to use the safety path plan mechanism to continue to operate the host vehicle to its current destination (possibly at lower speeds and with greater spacing between the host vehicle and other objects/vehicles). However, in other implementations, the secondary automated driving controller 205 is configured to determine a safety path plan that will safely remove the host vehicle from the roadway and bring the vehicle to a stop as soon as possible. For example, in some implementations, the secondary automated driving controller 205 is configured to determine a safety path plan that will bring the host vehicle to a stop at the side of the current roadway. In some implementations, the secondary automated driving controller 205 is configured to determine a safety path plan that will cause the host vehicle to navigate to a less busy roadway (e.g., taking the next available exit ramp) before coming to a stop.

In some implementations, the secondary automated driving controller 205 is configured to determine a safety path plan that will navigate the host vehicle to the nearest available service facility (e.g., a vehicle dealer or repair shop). For example, in some implementation, the secondary automated driving controller 205 is configured to determine a current location of the host vehicle (e.g., using GPS) and, in response to detecting a fault condition in the primary automated driving controller 203, to communicate with a remote system (e.g., searching the Internet or a specific server via a LTE transceiver of the host vehicle) to identify an available service facility that is nearest to the current location of the host vehicle. The secondary automated driving controller 205 would then proceed to provide autonomous operation of the host vehicle to navigate from the current location of the host vehicle to the location of the identified service facility. In some implementations, the secondary automated driving controller 205 may be configured to identify an "available" service facility as one of a plurality of service facilities in a predefined list of approved service facilities for the vehicle. In some implementations, the secondary automated driving controller 205 may be configured to identify an "available" service facility based at least in part on the current time of day, the estimated travel duration to the service facility, and the operating hours of the service facility (e.g., an "available" service facility is one that will be open for business when the host vehicle arrives).

Finally, although the example of FIG. 5 illustrates the secondary automated driving controller 205 taking over automated control of the vehicle in response to detecting a fault condition of the primary automated driving controller 203 (i.e., when the determined path plan is not within the permissible path area), in some implementations, the secondary automated driving controller 205 may instead be configured to transition from the current automated driving mode to a manual driving mode or a partially automated driving mode in response to detecting the fault condition. Additionally, in some implementations, the secondary automated driving controller 205 may be configured to output a prompt to the user asking the user whether they would like to transition to a manual driving mode (e.g., on a touch-sensitive display screen located within the operator cab of the vehicle). If the user responds to the prompt with an affirmative input (i.e., approving the transition from auto-mated to manual driving), the vehicle transitions into the manual driving mode and the vehicle systems operate based on inputs received through the manual user controls (e.g., the steering wheel, the accelerator pedal, and the brake pedal). However, if the user provides a negative response (i.e., rejecting the transition to manual driving) or, in some implementations, if the user does not provide any response to the prompt, the secondary automated driving controller 205 will proceed to operate the host vehicle in automated driving mode according to the safety path plan.

Accordingly, the systems and methods described herein provide a safety control framework for automated driving systems in which a second controller—with different/di-verse hardware and/or software than the first controller—verifies whether a path plan generated by the first controller meets certain safety conditions and preempts the first con-troller from controlling automated driving of the host vehicle in response to determining that the path plan does not satisfy the safety conditions. In some implementations, the second controller is configured to preempt the first controller by operating the vehicle under automated control using a safety path plan generated by the second controller. Further features and advantages are set forth in the following claims.

What is claimed is:

1. An automated driving system comprising:
a primary controller including a primary electronic pro-cessor and a primary memory, the primary controller configured to
determine, based at least in part on vehicle sensor data indicative of one or more detected objects, a location of a host vehicle relative to the one or more detected objects,
determine, based at least in part on the relative location of the host vehicle, a path plan for the host vehicle,
transmit to a secondary controller data indicative of the path plan for the host vehicle, and
transmit control signals to at least one vehicle system selected from a group consisting of a steering sys-tem, a braking system, and a drivetrain system, wherein the control signals cause the at least one vehicle system to operate movement of the host vehicle according to the path plan; and
the secondary controller including a secondary electronic processor and a secondary memory, the secondary controller configured to
receive the data from the primary controller indicative of the path plan for the host vehicle,
determine, based at least in part on the vehicle sensor data indicative of the one or more detected objects, whether the path plan is a permissible path in accor-dance with one or more safety conditions, and
preempt the transmission of the control signals from the primary controller to the at least one vehicle system in response to determining that the path plan is not a permissible path.

2. The automated driving system of claim 1, wherein the secondary controller is configured to preempt the transmis-sion of the control signals from the primary controller to the at least one vehicle system by transmitting a preemption signal to the primary controller, and wherein the primary controller is configured to transmit the control signals to the at least one vehicle system by transmitting the control signals to the at least one vehicle system only in an absence of the preemption signal from the secondary controller.

3. The automated driving system of claim 1, wherein the secondary controller is further configured to
determine, based at least in part on the vehicle sensor data indicative of the one or more detected objects, the location of the host vehicle relative to the one or more detected objects,
in response to preempting the transmission of the control signals from the primary controller to the at least one vehicle system, determine a safety path plan, and
transmit alternate control signals to the at least one vehicle system, wherein the alternate control signals cause the at least one vehicle system to operate move-ment of the host vehicle according to the safety path plan, wherein the safety path plan is different from the path plan.

4. The automated driving system of claim 3, wherein the secondary controller is configured to determine the safety path plan by determining the safety path plan according to higher ASIL requirements than the path plan determined by the primary controller.

5. The automated driving system of claim 3, wherein the primary controller is configured to determine the path plan for the host vehicle that maintains a first minimum distance between the host vehicle and the one or more detected objects, wherein the secondary controller is configured to determine the safety path plan for the host vehicle that maintains a second minimum distance between the host vehicle and the one or more detected objects, wherein the second minimum distance is greater than the first minimum distance.

6. The automated driving system of claim 3, wherein the secondary controller is configured to determine the safety path plan by determining a safety path plan that moves the host vehicle from its current location to at least one selected from a group consisting of a side of a roadway and an exit ramp.

7. The automated driving system of claim 3, wherein the secondary controller is configured to determine the safety path plan by identifying a location of a service facility and determining a safety path plan that moves the host vehicle from the current location of the host vehicle to the location of the service facility.

8. The automated driving system of claim 2, wherein the secondary controller is further configured to prompt a user to initiate a manual driving mode in response to determining that the path plan is not a permissible path in accordance with the one or more safety conditions.

9. The automated driving system of claim 1, wherein the secondary controller is further configured to determine whether the path plan is a permissible path in accordance with the one or more safety conditions includes determining, based on the detected one or more objects, a
      permissible path area of a roadway surface, wherein the
      host vehicle operating in the permissible path area does
      not violate the one or more safety conditions, and
   determining whether the path plan is contained within the
      permissible path area.

10. A method of controlling an automated driving system, the method comprising:

determining, by a primary controller based at least in part
      on vehicle sensor data indicative of one or more
      detected objects, a location of a host vehicle relative to
      the one or more detected objects;
   determining, by a primary controller based at least in part
      on the relative location of the host vehicle, a path plan
      for the host vehicle;
   transmitting, from the primary controller to a secondary
      controller, data indicative of the path plan for the host
      vehicle;
   receiving, by the secondary controller, the data from the
      primary controller indicative of the path plan for the
      host vehicle;
   determining, by the secondary controller based at least in
      part on the vehicle sensor data indicative of the one or
      more detected objects, whether the path plan is a
      permissible path in accordance with one or more safety
      conditions;
   transmitting control signals from the primary controller to
      at least one vehicle system selected from a group
      consisting of a steering system, a braking system, and
      a drivetrain system, wherein the control signals cause
      the at least one vehicle system to operate movement of
      the host vehicle according to the path plan; and
   preempting, by the secondary controller, the transmission
      of the control signals from the primary controller to the
      at least one vehicle system in response to determining
      that the path plan is not a permissible path.

11. The method of claim 10, wherein preempting, by the secondary controller, the transmission of the control signals from the primary controller to the at least one vehicle system includes transmitting a preemption signal from the secondary controller to the primary controller, and wherein transmitting the control signals from the primary
      controller to the at least one vehicle system includes
      transmitting the control signals from the primary con-
      troller to the at least one vehicle system only in an
      absence of the preemption signal from the secondary
      controller.

12. The method of claim 10, further comprising:

determining, by the secondary controller based at least in
      part on the vehicle sensor data indicative of the one or
      more detected objects, the location of the host vehicle
      relative to the one or more detected objects;
   in response to preempting the transmission of the control
      signals from the primary controller to the at least one
      vehicle system, determining, by the secondary control-
      ler, a safety path plan, and
   transmitting, by the secondary controller, alternate control
      signals to the at least one vehicle system, wherein the
      alternate control signals cause the at least one vehicle
      system to operate movement of the host vehicle accord-
      ing to the safety path plan, wherein the safety path plan
      is different from the path plan.

13. The method of claim 12, wherein determining, by the secondary controller, the safety path plan includes determining the safety path plan according to higher ASIL require-ments than the path plan determined by the primary con-troller.

14. The method of claim 12, wherein determining, by the primary controller, the path p Previously Presented lan for the host vehicle includes determining a path plan that maintains a first minimum distance between the host vehicle and the one or more detected objects, wherein determining, by the secondary controller the safety path plan includes determining a safety path plan for the host vehicle that maintains a second minimum distance between the host vehicle and the one or more detected objects, wherein the second minimum distance is greater than the first minimum distance.

15. The method of claim 12, wherein determining, by the secondary controller, the safety path plan includes determin-ing a safety path plan that moves the host vehicle from its current location to at least one selected from a group consisting of a side of a roadway and an exit ramp.

16. The method of claim 12, wherein determining, by the secondary controller, the safety path plan includes identify-ing a location of a service facility and determining a safety path plan that moves the host vehicle from the current location of the host vehicle to the location of the service facility.

17. The method of claim 10, further comprising generat-ing, by the secondary controller a prompt to a user to initiate a manual driving mode in response to determining that the path plan is not a permissible path in accordance with the one or more safety conditions.

18. The method of claim 10, wherein determining, by the secondary controller, whether the path plan is a permissible path in accordance with the one or more safety conditions includes determining, by the secondary controller based on the
      detected one or more objects, a permissible path area of
      a roadway surface, wherein the host vehicle operating
      in the permissible path area does not violate the one or
      more safety conditions, and
   determining, by the secondary controller, whether the
      path plan is contained within the permissible path area.

19. The method of claim 13, wherein determining, by the secondary controller, the safety path plan includes identifying a location of a service facility and determining a safety path plan that moves the host vehicle from the current location of the host vehicle to the location of the service 5 facility, the method further comprising generating, by the secondary controller a prompt to a user to initiate a manual driving mode in response to determining that the path plan is not a permissible path in accordance with the 10 one or more safety conditions, and wherein the primary controller includes a primary electronic processor and a primary memory, and the secondary controller includes a secondary electronic processor and a secondary memory. 15

20. The automated driving system of claim 4, wherein the secondary controller is configured to determine the safety path plan by identifying a location of a service facility and determining a safety path plan that moves the host vehicle from the current location of the host vehicle to the location 20 of the service facility, and wherein the secondary controller is further configured to prompt a user to initiate a manual driving mode in response to determining that the path plan is not a permissible path in accordance with the one or more 25 safety conditions.

\* \* \* \* \*